(12) United States Patent
Ori et al.

(10) Patent No.: US 7,502,299 B2
(45) Date of Patent: Mar. 10, 2009

(54) OBJECTIVE OPTICAL SYSTEM AND OPTICAL PICKUP DEVICE USING IT

(75) Inventors: Tetsuya Ori, Koshigaya (JP); Toshiaki Katsuma, Tokyo (JP); Masao Mori, Saitama (JP); Yu Kitahara, Saitama (JP)

(73) Assignee: Fujinon Corporation, Saitama (JP)

( * ) Notice: Subject to any disclaimer, the term of this patent is extended or adjusted under 35 U.S.C. 154(b) by 877 days.

(21) Appl. No.: 10/936,765

(22) Filed: Sep. 9, 2004

(65) Prior Publication Data
US 2005/0063283 A1   Mar. 24, 2005

(30) Foreign Application Priority Data
Sep. 19, 2003   (JP)   .............................. 2003-328672

(51) Int. Cl.
*G11B 7/135* (2006.01)
(52) U.S. Cl. ............................. 369/112.04; 369/109.02; 369/110.03
(58) Field of Classification Search ....................... None
See application file for complete search history.

(56) References Cited
U.S. PATENT DOCUMENTS
6,590,851 B1 * 7/2003 Kim et al. ............... 369/112.01

2003/0185134 A1 * 10/2003 Kimura et al. ......... 369/112.08

OTHER PUBLICATIONS

Sumito Nishioka et al., "BD/DVD/CG Compatible Optical Pickup Technology", excerpt from 50th Lecture of Applied Physics Assoc., Univ. of Kanagawa, Mar. 2003, p. 1250.

* cited by examiner

*Primary Examiner*—Joseph H Feild
*Assistant Examiner*—Parul Gupta
(74) *Attorney, Agent, or Firm*—Arnold International; Jon W. Henry; Bruce Y. Arnold (57) ABSTRACT

An objective optical system is formed of a diffractive optical element with a diffractive surface formed on a virtual plane and an objective lens for focusing three light beams of three different wavelengths at three different numerical apertures onto desired positions of three different recording media with substrates that include different thicknesses, such as an AOD, a DVD, and a CD, that introduce different amounts of spherical aberration in the focused beams. The objective optical system provides compensating spherical aberrations to the three light beams, two of which are incident on the objective optical system as collimated beams and one of which is incident as a diverging beam. The objective optical system focuses second-order diffracted light of one wavelength and first-order diffracted light of the other two wavelengths. An optical pickup device includes the objective optical system, the recording media, and a light source that provides the three light beams.

19 Claims, 3 Drawing Sheets

OBJECTIVE OPTICAL SYSTEM AND OPTICAL PICKUP DEVICE USING IT

BACKGROUND OF THE INVENTION

In response to the development of various optical recording media in recent years, an optical pickup device that can be commercially used for recording or reproducing from two types of optical recording media has been known. For example, a device that can record or reproduce either one of a DVD (digital versatile disc) and a CD (compact disc including a CD-ROM, CD-R and CD-RW) using one optical pickup device has been used. For the DVD, it is known to use visible light with a wavelength of, for example, 657 nm, in order to increase the density of the recording. However, there are some CDs that have no sensitivity to visible light, and thus near-infrared light with a wavelength of approximately 790 nm is commonly used.

Therefore, in an optical pickup device that is commonly used for both of these optical recording media, a so-called double wavelength beam system using two beams of different wavelengths may be used to irradiate a recording medium. For the different recording media, different numerical apertures of the objective lens based on different technical standards are used. For example, for the DVD technical standard, the numerical aperture is set at 0.6, and for the CD technical standard, the numerical aperture is set approximately in the range of 0.45 to 0.52. In addition, the substrate thickness of the recording media, with the substrate being a protective layer generally made of polycarbonate (PC), is standardized to different values depending on the recording medium, such as 0.6 mm for a DVD and 1.2 mm for a CD.

As described above, since the substrate thickness of the optical recording medium is standardized and differs according to the type of optical recording medium, the amount of spherical aberration introduced by the substrate is different based on the different standardized thickness of the substrate of different recording media. Consequently, for optimum focus of each of the light beams on the corresponding optical recording medium, it is necessary to optimize the amount of spherical aberration in each light beam at each wavelength for recording and reproducing. This makes it necessary to design the objective lens with different focusing effects according to the light beam and recording medium being used.

Additionally, in response to rapid, almost daily, increases of data capacity, the demand for an increase in the recording capacity of recording media has been strong. It is known that the recording capacity of an optical recording medium can be increased by using light of a shorter wavelength and by increasing the numerical aperture (NA) of an objective lens. Concerning a shorter wavelength, the development of a semiconductor laser with a shorter wavelength using a GaN substrate (for example, a semiconductor laser that emits a laser beam of 408 nm wavelength) has advanced to the point where this wavelength is now available for use.

With the development of short wavelength semiconductor lasers, research and development of AODs (Advanced Optical Disks), also known as HD-DVDs, that provide approximately 20 GB of data storage on a single side of an optical disk by using short wavelength light is also progressing. As the AOD standard, the numerical aperture and disk thickness are selected to be close to, but slightly different, from those of DVDs, with the numerical aperture (NA) and disk thickness for an AOD being set at 0.65 and 0.6 mm, respectively.

Furthermore, research and development of Blu-ray disk (BD) systems that use a shorter wavelength of disk illuminating light, similar to AOD systems, has progressed, and the standardized values of numerical aperture and disk thickness for these systems are completely different from the corresponding DVD and CD values, with a numerical aperture (NA) of 0.85 and a disk thickness of 0.1 mm being standard. Unless otherwise indicated, hereinafter, AODs and Blu-ray disks collectively will be referred to as "AODs."

The development of an optical pickup device that can be used for three different types of optical recording media, such as AODs, DVDs and CDs as described above, has been demanded and objective optical systems for mounting in such devices have already been proposed. For example, an objective optical system that includes a diffractive optical element with a refractive surface and a diffractive surface and a biconvex lens is described on page 1250 of Extended Abstracts, $50^{th}$ Japan Society of Applied Physics and Related Societies (March, 2003). The objective optical system described in this publication is designed so that: second-order diffracted light from the diffractive optical element is used for a BD optical recording medium; first-order diffracted light from the diffractive optical element is used for a DVD optical recording medium; and also first-order diffracted light from the diffractive optical element is used for a CD optical recording medium. The rear surface of the diffractive optical element (the side opposite the illuminating light beams), is concave in order to aid in correcting spherical aberration that is created by the thickness of the protective layer of each optical recording medium. The spherical aberration created varies with the thickness of the protective layer. Chromatic aberration is also improved relative to a single component lens.

In the technology described in the above-mentioned publication, in order to reduce the generation of coma associated with a shift of the objective optical system relative to an incident luminous flux, when recording or reproducing information to/from the BD, the design is such that the light incident on the diffractive optical element is converging light. Further, when recording or reproducing information to/from the DVD or the CD, the design is such that the light incident on the diffractive optical element is collimated light and diverging light, respectively.

However, there presently is strong demand for a compact device that provides greater freedom in positioning the objective optical system within the recording and reproducing device. In order to achieve this, it is necessary to create a design such that collimated light, rather than diverging or converging light, be incident on the objective optical system for at least two of the three light beams that are being used. Additionally, in particular with regard to the light beam with the shortest wavelength of the three light beams, if converging light is incident on the diffractive optical element, there are problems of the diffraction efficiency being reduced due to the angle of incidence of the light rays on the diffractive grooves of the diffractive optical element being tilted from the desired angle of incidence, which greatly decreases the stability of the tracking.

BRIEF SUMMARY OF THE INVENTION

The present invention relates to an objective optical system for optical recording media that can efficiently focus each of three light beams on a corresponding one of three optical recording media with different technical standards of the substrate thickness, the wavelengths of the three light beams, and the numerical aperture (NA) of the objective optical system for each of the three light beams. The objective optical system of the present invention uses a diffractive optical element that allows for increased freedom in selecting the position of the objective optical system and improved diffraction efficiency of the light beam with the short wavelength that is used with AODs, along with concurrently increasing the stability of the tracking. The present invention further relates to such an objective optical system with the diffractive optical element being on a lens element of the objective optical system. The present invention further relates to an optical pickup device using this objective optical system.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to an objective optical system for optical recording media that can be used to focus each of three different light beams of three different wavelengths, $\lambda 1$, $\lambda 2$, and $\lambda 3$, from a light source to a different desired position for each of the first, second and third optical recording media of substrate thicknesses, d1, d2, and d3, respectively, for recording and reproducing information. As herein defined, unless otherwise indicated, the term "light source" refers to the source of the three different light beams of three different wavelengths, whether the light beams originate from a single light emitting source or from separate light emitting sources, such as semiconductor lasers. Additionally, the term "light source" may also include various optical elements, including beamsplitters, mirrors, and converging lenses, which for one or more of the light beams of wavelengths $\lambda 1$, $\lambda 2$, and $\lambda 3$ may operate as a collimator lens to provide a collimated light beam incident on the objective optical system.

The objective optical system includes, from the light source side: a diffractive optical element with one surface of the diffractive optical element being a diffractive surface defined by a phase function $\Phi$, as will be discussed in detail later, and the other surface being a concave surface; and an objective lens of positive refractive power with both surfaces being rotationally symmetric aspheric surfaces. The phase function $\Phi$ is chosen so that the objective optical system is able to focus each of the three different light beams of three different wavelengths, $\lambda 1$, $\lambda 2$, and $\lambda 3$ at a different desired position for each of the first, second and third optical recording media of substrate thicknesses, d1, d2, and d3, respectively.

The objective optical system is constructed so that second-order diffracted light diffracted by the diffractive optical element is focused onto the desired position of the first optical recording medium when the first light beam of wavelength $\lambda 1$ is incident on the diffractive optical element as collimated light, first-order diffracted light diffracted by the diffractive optical element is focused onto the desired position of the second optical recording medium when the second light beam of wavelength $\lambda 2$ is incident on the diffractive optical element as collimated light, and first-order diffracted light diffracted by the diffractive optical element is focused onto the desired position of the third optical recording medium when the third light beam of wavelength $\lambda 3$ is incident on the diffractive optical element as diverging light. Thus, advantages in the correction of aberrations by using a diffractive optical element and an objective lens can be achieved with the light beams of both wavelengths $\lambda 1$ and $\lambda 2$ being incident on the diffractive optical element as collimated light.

Preferably, the objective optical system is configured to introduce spherical aberration in the second-order diffracted light from the collimated light beam of a first wavelength $\lambda 1$ for compensating for substantial spherical aberration introduced by the thickness d1 of the first optical recording medium; the objective optical system is configured to introduce spherical aberration in the first-order diffracted light from the collimated light beam of a second wavelength $\lambda 2$ for compensating for substantial spherical aberration introduced by the thickness d2 of the second optical recording medium; and the objective optical system is configured to introduce spherical aberration in the first-order diffracted light from the diverging light beam of a third wavelength $\lambda 3$ for compensating for substantial spherical aberration introduced by the thickness d3 of the third optical recording medium.

The substrate thicknesses, d1, d2, and d3, of the three optical recording media may be standardized thicknesses, and the three wavelengths, $\lambda 1$, $\lambda 2$, and $\lambda 3$ may be standardized wavelengths. The substrate thicknesses, wavelengths, and the numerical apertures of the objective optical system for the three light beams are selected so that the following Conditions (1)-(3) are satisfied:

$$NA1 \geq NA2 > NA3 \qquad \text{Condition (1)}$$

$$\lambda 1 < \lambda 2 < \lambda 3 \qquad \text{Condition (2)}$$

$$d1 \leq d2 < d3 \qquad \text{Condition (3)}$$

where
- NA1 is the numerical aperture of the objective optical system for light of the first wavelength $\lambda 1$ that is focused on the optical recording medium of substrate thickness d1,
- NA2 is the numerical aperture of the objective optical system for light of the second wavelength $\lambda 2$ that is focused on the optical recording medium of substrate thickness d2, and
- NA3 is the numerical aperture of the objective optical system for light of the third wavelength $\lambda 3$ that is focused on the optical recording medium of substrate thickness d3.

Under the above Conditions (1)-(3), the light beam with the shortest wavelength of light λ1 is focused on the first optical recording medium with a substrate thickness d1 and the light beam with the second shortest wavelength of light λ2 is focused on the second optical recording medium with a substrate thickness d2, with both light beams being incident on the diffractive optical element as collimated light.

Because, as explained above, when recording or replaying information to/from the AOD 9a and the DVD 9b, the light beam used for the AOD 9a or the DVD 9b, enters the objective optical system 8 as collimated light, there is substantial freedom in selecting the position of the objective optical system along the optical axis, which assists in achieving a compact system. In addition, it particularly enables improvement of the diffraction efficiency of the beam of light with a short wavelength used for the AODs generally, and concurrently, it also enables improvement of the tracking stability. Additionally, the fact that the light beam used for the CD 9c is only slightly diverging assists in designing the objective optical system so as to have excellent aberration correction.

The spherical aberration introduced by the objective optical system to each of the light beams of wavelengths λ1, λ2, and λ3 compensates for the spherical aberration introduced by the substrate thickness d1, d2, and d3 of each of the AOD, DVD, and CD, respectively, so as to minimize spherical aberration in the focused light beam incident onto the AOD, DVD, and CD.

Additionally, it is preferable that the diffractive surface be formed as a diffractive structure on a virtual plane, that is, the surface where the diffractive structure is formed would be planar but for the diffractive structures of the diffractive surface, and that the virtual plane be perpendicular to the optical axis.

Furthermore, preferably the following Condition (4) is satisfied:

$$|f2/f1|<0.03 \qquad \text{Condition (4)}$$

where f1 is the focal length of the diffractive optical element for second-order diffracted light at the first wavelength λ1, and f2 is the focal length of the objective lens having positive refractive power at the first wavelength λ1.

Additionally, it is particularly advantageous that the above-mentioned first optical recording medium 9a be an AOD, the above-mentioned second optical recording medium 9b be a DVD, and the above-mentioned third optical recording medium 9c be a CD.

An optical pickup device according to the present invention incorporates an objective optical system for optical recording media as described above.

The invention will now be discussed in general terms with reference to FIGS. 1A-1C that shows the geometry of the objective optical system of Embodiment 1 of the present invention and FIG. 4 that shows an optical pickup device using the objective optical system of Embodiment 1. The figures show the elements of the objective optical system schematically. In order to prevent FIG. 4 from being too complicated, only one pair of light rays from each light beam are illustrated at every location of the objective optical system in FIG. 4, even where light of more than one wavelength is present, including at the prisms 2a and 2b.

Figure 4:
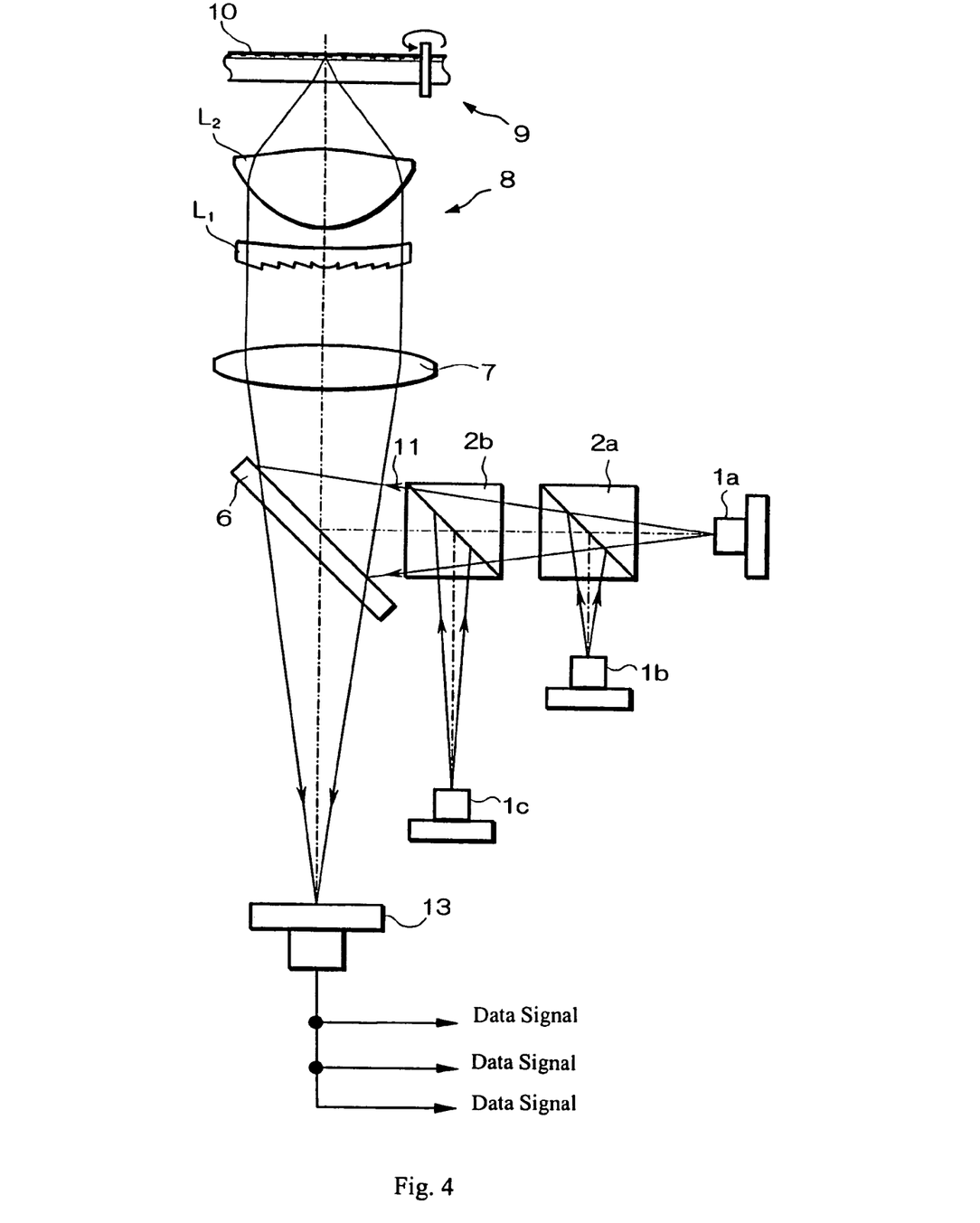
FIG. 4 is a schematic diagram of an optical pickup device using the objective optical system of FIGS. 1A-1C.

As shown in FIG. 4, a laser beam 11 that is emitted from one of the semiconductor lasers 1a, 1b, and 1c is reflected by a half mirror 6, is collimated by a collimator lens 7, (with the laser beam from the semiconductor laser 1c that, as an exemplary arrangement, emits light of wavelength λ3 being output as a slightly divergent beam from the collimator lens 7), and is focused by the objective optical system 8 onto a recording area 10 of an optical recording medium 9.

Figure 1A:
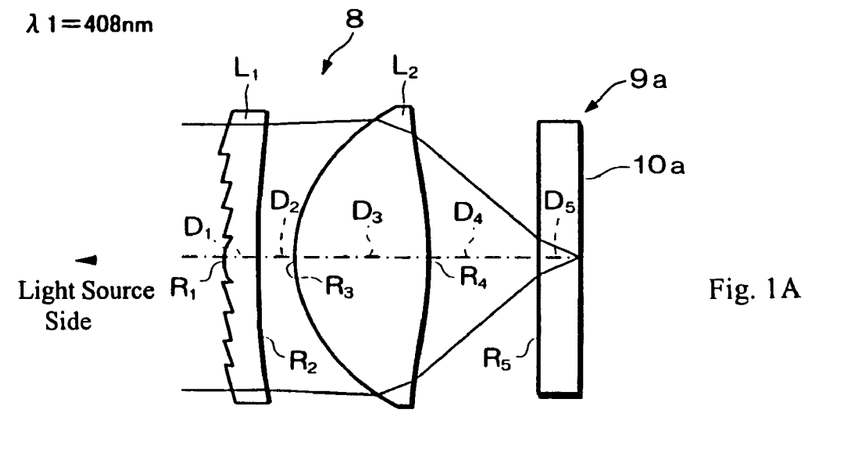
FIGS. 1A-1C are schematic diagrams that depict cross-sectional views of the objective optical system of Embodiment 1 of the present invention, with FIG. 1A showing the operation of the objective optical system when used with optical recording medium 9a, with FIG. 1B showing the operation of the objective optical system when used with a second optical recording medium 9b, and with FIG. 1C showing the operation of the objective optical system when used with a third optical recording medium 9c.
Figure 1B:
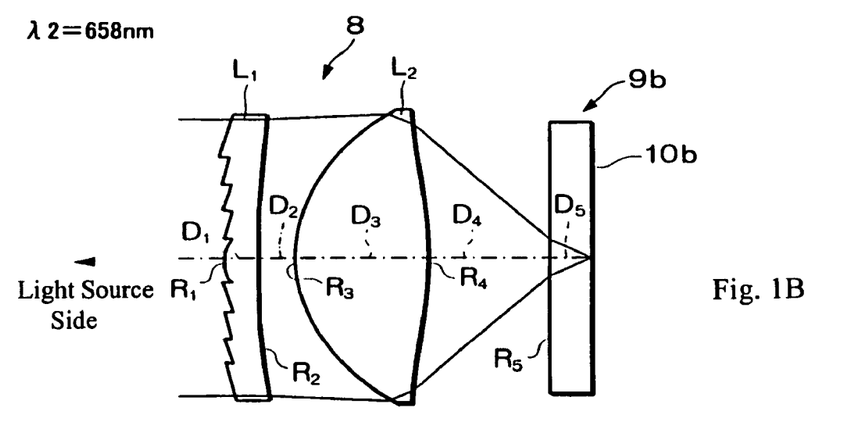
Figure 1C:
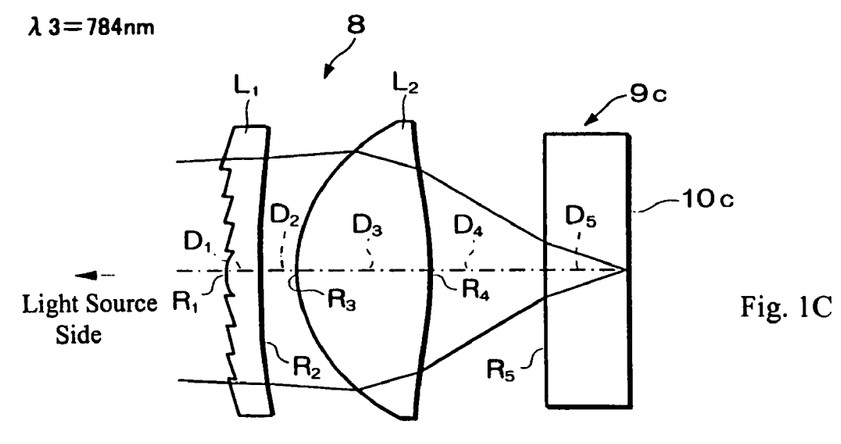

More specifically, as shown in FIGS. 1A-1C, the arrangement includes an optical recording medium 9a that is an AOD with a substrate thickness d1 of 0.6 mm used with a light beam of wavelength λ1 that is equal to 408 nm and with a numerical aperture NA1 of 0.65 (FIG. 1A), an optical recording medium 9b that is a DVD with a substrate thickness d2 of 0.6 mm used with a light beam of wavelength λ2 that is equal to 658 nm and with a numerical aperture NA2 of 0.65 (FIG. 1B), and an optical recording medium 9c that is a CD with a substrate thickness d3 of 1.2 mm used with a light beam of wavelength λ3 that is equal to 784 nm and with a numerical aperture NA3 of 0.51 (FIG. 1C).

The semiconductor laser 1a emits the visible laser beam having the wavelength of approximately 408 nm (λ1) for AODs. The semiconductor laser 1b emits the visible laser beam having the wavelength of approximately 658 nm (λ2) for DVDs. The semiconductor laser 1c emits the near-infrared laser beam having the wavelength of approximately 784 nm (λ3) for CDs such as CD-R (recordable optical recording media) (hereinafter the term CD generally represents CDs of all types).

The arrangement of FIG. 4 does not preclude semiconductor lasers 1a-1c providing simultaneous outputs. However, it is preferable that the lasers be used alternately depending on whether the optical recording media 9 of FIG. 4 is specifically, as shown in FIGS. 1A-1C, an AOD 9a, a DVD 9b, or a CD 9c. As shown in FIG. 4, the laser beam output from the semiconductor lasers 1a, 1b irradiates the half mirror 6 by way of prisms 2a, 2b, and the laser beam output from the semiconductor laser 1c irradiates the half mirror 6 by way of the prism 2b.

The collimator lens 7 is schematically shown in FIG. 4 as a single lens element. However, it is desirable to use a collimator lens made up of more than one lens element in order to better correct chromatic aberration of the collimator lens 7.

In the optical pickup device of the present invention, each of the optical recording media 9, as shown in FIG. 4, whether an AOD 9a, a DVD 9b or a CD 9c shown in FIGS. 1A-1C, respectively, must be arranged at a predetermined position along the optical axis, for example, on a turntable, so that the recording region 10 of FIG. 4 (one of recording regions 10a, 10b, and 10c of an AOD 9a, a DVD 9b and a CD 9c of FIGS. 1A-1C) is positioned at the focus of the light beam of the corresponding wavelength (λ1, λ2, and λ3 for recording regions 10a, 10b, and 10c, respectively) in order to properly record signals and reproduce recorded signals.

In the recording region 10, pits carrying signal information are arranged in tracks. The reflected light of a laser beam 11 is made incident onto the half mirror 6 by way of the objective optical system 8 and the collimator lens 7 while carrying the signal information, and the reflected light is transmitted through the half mirror 6. The transmitted light is then incident on a four-part photodiode 13. The respective quantities of light received at each of the four parts of the four-part photodiode 13 are converted to electrical signals that are operated on by calculating circuits (not shown in the drawings) in order to obtain data signals and respective error signals for focusing and tracking.

Because the half mirror 6 is inserted into the optical path of the return light from the optical recording media 9 at a forty-five degree angle to the optical axis, the half mirror 6 introduces astigmatism into the light beam, as a cylindrical lens may introduce astigmatism, whereby the amount of focusing error may be determined according to the form of the beam spot of the return light on the four-part photodiode 13. Also, a grating may be inserted between the semiconductor lasers 1a-1c and the half mirror 6 so that tracking errors can be detected using three beams.

As shown in FIGS. 1A-1C and FIG. 4, the objective optical system of the present invention includes, in order from the light source side, a diffractive optical element $L_1$, with one surface being a diffractive surface and the other surface being a concave spherical surface, and an objective lens $L_2$ of positive refractive power with two rotationally symmetric aspheric surfaces. The diffractive surface is defined by the phase function $\Phi$.

Additionally, in the use of different types of optical recording media with different disk thicknesses related to different substrate thicknesses, it has been known to use a diffractive optical element with a diffractive surface to assist in optimizing corrections of various aberrations, such as spherical aberration, for light beams of different wavelengths corresponding to the different types of optical recording media. With these different types of optical recording media, the amount of spherical aberration is different mainly due to the differences in the thicknesses of the substrates that are protective layers. However, the use of the diffractive surface of the diffractive optical element results in different focusing effects for the light beams of different wavelengths used with the different types of recording media that enables excellent correction of aberrations, along with allowing the use of collimated light beams, which allows for greater freedom in the positioning of the objective optical system.

The lens surfaces that are aspheric are defined using the following aspherical equation:

$$Z=[(C \cdot Y^2)/\{1+(1-K \cdot C^2 \cdot Y^2)^{1/2}\}]+\Sigma A_i \cdot Y^{2i} \qquad \text{Equation (A)}$$

where
  Z is the length (in mm) of a line drawn from a point on the aspheric lens surface at a distance Y from the optical axis to the tangential plane of the aspheric surface vertex,
  C is the curvature (=1/the radius of curvature, R) of the aspheric lens surface on the optical axis,
  Y is the distance (in mm) from the optical axis,
  K is the eccentricity, and
  $A_i$ is an aspheric coefficient.

By using rotationally symmetric lens surfaces expressed in terms of Equation (A), desired focusing with excellent correction of aberrations can be provided on a selected recording medium 9 and excellent recording and reproducing of information can be achieved.

Preferably, as shown in FIGS. 1A-1C and FIG. 4, the surface of the diffractive optical element $L_1$ that is on the light source side is the diffractive surface, and, as recited above, it is preferable that the diffractive surface be formed as a diffractive structure on a virtual plane, that is, the surface where the diffractive structure is formed would be planar but for the diffractive structures of the diffractive surface, and that the virtual plane be perpendicular to the optical axis. Preferably, the cross-sectional configuration of the diffractive surface is serrated so as to define a so-called kinoform. FIGS. 1A-1C and FIG. 4 exaggerate the actual size of the serrations of the diffractive surfaces.

The diffractive surface adds a difference in optical path length equal to $m \cdot \lambda \cdot \Phi/(2\pi)$ to the diffracted light, where $\lambda$ is the wavelength, $\Phi$ is the phase function of the diffractive optical surface, and m is the order of the diffracted light that is focused on a recording medium 9. The phase function $\Phi$ is given by the following equation:

$$\Phi = \Sigma W_i \cdot Y^{2i} \qquad \text{Equation (B)}$$

where
  Y is the distance in mm from the optical axis; and
  $W_i$ is a phase coefficient.

The specific heights of the serrated steps of the diffractive surface of the diffractive optical element $L_1$ are based on ratios of diffracted light of different orders for the light beams of different wavelengths $\lambda 1$, $\lambda 2$, and $\lambda 3$. Additionally, the outer diameter of the diffractive surface can be determined by taking into consideration the numerical aperture (NA) and the beam diameter of the incident laser beam 11 of each of the three wavelengths. It is preferable that the diffractive surface formed on the diffractive optical element $L_1$ and the rotationally symmetric aspheric surfaces formed on the objective lens $L_2$ are determined to focus each of the three beams of light with the three wavelengths, $\lambda 1$, $\lambda 2$, and $\lambda 3$, on a corresponding recording region 10, as shown in FIG. 4 (10a, 10b, 10c, as shown in FIGS. 1A-1C, respectively) with excellent correction of aberrations.

Furthermore, it is preferable that the diffractive surface have a configuration so as to provide the greatest quantity of second-order diffracted light for the laser beam for the AOD with a light wavelength of 408 nm ($\lambda 1$), so as to provide the greatest quantity of first-order diffracted light for the laser beam for the DVD with a light wavelength of 658 nm ($\lambda 2$), and in addition, so as to provide the greatest quantity of first-order diffracted light for the laser beam for the CD with a light wavelength of 784 nm ($\lambda 3$).

As mentioned above, by providing different orders of diffracted light for the laser beam for the AOD and for the laser beam for the DVD, and also by providing different orders of diffracted light for the laser beam for the AOD and for the laser beam for CD, enables focusing the three light beams having different wavelengths at desired positions.

Additionally, satisfying Condition (4) above prevents deterioration of the optical performance of the objective optical system by minimizing the effects of a traverse offset between the diffractive optical element $L_1$ and the objective lens $L_2$ by requiring the power of the diffractive optical element $L_1$ to be much smaller relative to the power of the objective lens $L_2$ (the power being the inverse of the focal length). In other words, in order to reliably keep the wavefront aberration of the objective optical system smaller than a predetermined value for improved performance, the transverse offset between the diffractive optical element $L_1$ and the objective lens $L_2$ must be kept smaller than a predetermined value. This is accomplished by satisfying Condition (4).

One standard for enabling excellent optical performance of the objective optical system of the present embodiment is to require the wavefront aberration be less than 0.07 $\lambda$rms, which is the Marechal criterion. If this criterion is attempted to be satisfied, when Condition (4) is satisfied, that is, f2/|f1| is less than 0.03, a traverse offset greater than 0.0065 mm is allowed. In order to improve productivity, it is desirable that a tranverse offset of 0.0072 mm or more be allowed, in which case it is necessary to replace Condition (4) with a condition that f2/|f1| be 0.01 or less. In order to further improve productivity, it is desirable that a tranverse offset of 0.0077 mm or more be allowed, in which case it is necessary to replace Condition (4) with a condition that f2/|f1| be 0.005 or less. In order to still further improve productivity, it is desirable that a tranverse offset of 0.0079 mm or more be allowed, in which case it is necessary to replace Condition (4) with a condition that f2/|f1| be 0.0003 or less.

Furthermore, although Condition (4) does not provide ideal performance, Condition (4) does provide high performance and excellent optical imaging, in general. For example, in order to satisfy the criterion of a wavefront aberration of 0.035 λrms or less, which is one-half of the wavefront aberration 0.07 λrms according to the Marechal criterion, a transverse offset of 0.0032 mm or greater is allowed by requiring f2/|f1| to be 0.03 or less. Similarly, excellent optical performance may be achieved with a transverse offset of 0.0036 mm or greater being allowed by requiring f2/|f1| to be 0.01 or less. Similarly, excellent optical performance may be achieved with a transverse offset of 0.0039 mm or greater being allowed by requiring f2/|f1| to be 0.005 or less, or with a transverse offset of 0.0040 mm or greater being allowed by requiring f2/|f1| to be 0.0003 or less.

Table 1 below lists the transverse offsets of the diffractive optical element $L_1$ relative to the objective lens $L_2$ allowed for a wavelength aberration of 0.07 λrms (the Marechal criterion) and for a wavelength aberration of 0.035 λ (one-half the Marechal criterion) at various values of f2/|f1|, including the limiting value of f2/|f1| of 0.03 of Condition (4).

TABLE 1

| f2/\|f1\| | Traverse offset (mm) (wavelength aberration of 0.07 λ rms) | Transverse offset (mm) (wavelength aberration of 0.035 λ rms) |
| --- | --- | --- |
| 0.0400 | 0.0056 | 0.0028 |
| 0.0300 | 0.0065 | 0.0032 |
| 0.0100 | 0.0072 | 0.0036 |
| 0.0050 | 0.0077 | 0.0039 |
| 0.0003 | 0.0079 | 0.0040 |

Two embodiments of the present invention will now be set forth in detail.

Embodiment 1

FIGS. 1A-1C are schematic diagrams that depict cross-sectional views of the objective optical system of Embodiment 1 of the present invention, with FIG. 1A showing the operation of the objective optical system when used with the optical recording medium 9a, with FIG. 1B showing the operation of the objective optical system when used with a second optical recording medium 9b, and with FIG. 1C showing the operation of the objective optical system when used with a third optical recording medium 9c. As shown in FIGS. 1A-1C, the objective optical system of the present invention includes, in order from the light source side, a diffractive optical element $L_1$, with one surface being a diffractive surface and the other surface being a concave spherical surface, and a biconvex objective lens $L_2$ with two rotationally symmetric aspheric surfaces. Additionally, the diffractive surface is formed as a diffractive structure on a virtual plane, that is, the surface where the diffractive structure is formed is planar but for the diffractive structures of the diffractive surface, and that the virtual plane is perpendicular to the optical axis. The diffractive surface is defined by the phase function Φ.

The diffractive surface is formed with a cross-sectional configuration of concentric serrations that define a grating. Second-order diffracted light diffracted by the diffractive optical element $L_1$ is focused onto the desired position at recording region 10a of the first optical recording medium 9a when the first light beam of wavelength λ1 is incident on the diffractive optical element as collimated light; first-order diffracted light diffracted by the diffractive optical element $L_1$ is focused onto the desired position at recording region 10b of the second optical recording medium 9b when the second light beam of wavelength λ2 is incident on the diffractive optical element as collimated light; and first-order diffracted light diffracted by the diffractive optical element $L_1$ is focused onto the desired position at recording region 10c of the third optical recording medium 9c when the third light beam of wavelength λ3 is incident on the diffractive optical element as diverging light.

As indicated in FIGS. 1A-1C, the objective optical system 8 favorably focuses light of each wavelength, λ1 of 408 nm, λ2 of 658 nm, and λ3 of 784 nm, onto a respective recording region 10a, 10b, or 10c of respective recording media 9a, 9b, and 9c, which are an AOD, a DVD, and a CD, respectively. Additionally, as shown in FIGS. 1A-1C, the objective optical system operates with an infinite conjugate on the light source side to provide collimated light beams of wavelengths λ1 and λ2 and operates with a finite conjugate on the light source side to provide a slightly diverging light beam of wavelength λ3.

Furthermore, each of the light beams is used alternately depending on whether recording medium 9a, 9b, or 9c is being illuminated.

Table 2 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths (λ1=408 nm for the AOD 9a, λ2=658 nm for the DVD 9b, and λ3=784 nm for the CD 9c), and the refractive indexes at the three used wavelengths.

TABLE 2

| # | Surface Type or Radius of Curvature | Surface Spacing | | | Refractive Index | | |
| --- | --- | --- | --- | --- | --- | --- | --- |
| | | λ = 408 nm | λ = 658 nm | λ = 784 nm | λ = 408 nm | λ = 658 nm | λ = 784 nm |
| 1 | diffractive | 0.500 | 0.500 | 0.500 | 1.53404 | 1.51437 | 1.51068 |
| 2 | 22.145 | 0.500 | 0.500 | 0.500 | | | |
| 3 | aspheric | 1.920 | 1.920 | 1.920 | 1.53404 | 1.51437 | 1.51068 |
| 4 | aspheric | 1.601 | 1.724 | 1.661 | | | |
| 5 | ∞ | 0.600 | 0.600 | 1.200 | 1.62000 | 1.58000 | 1.57000 |
| 6 | ∞ | | | | | | |

Table 3 below lists, for each used wavelength, the diaphragm diameter (in mm), the focal length f (in mm), the numerical aperture NA, and the apparent light source position (in mm, as measured from the diffractive surface of the diffractive optical element $L_1$).

TABLE 3

| | λ = 408 nm | λ = 658 nm | λ = 784 nm |
| --- | --- | --- | --- |
| diaphragm diameter | 3.9 | 4.1 | 3.3 |
| focal length, f | 3.00 | 3.13 | 3.13 |
| numerical aperture, NA | 0.65 | 0.65 | 0.51 |
| light source position | ∞ | ∞ | −30.60 |

Table 4 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 4 are zero.

TABLE 4

|  | $3^{rd}$ Surface | $4^{th}$ Surface |
|---|---|---|
| C | 5.0562890E-1 | -1.8661171E-1 |
| K | 4.4702170E-2 | 5.0667520E-2 |
| $A_2$ | 3.3007562E-3 | 5.8382907E-3 |
| $A_3$ | 1.1625917E-5 | 2.5032830E-3 |
| $A_4$ | 3.9902636E-4 | -5.4114317E-4 |
| $A_5$ | -2.4497932E-5 | 3.3662903E-5 |

Table 5 below lists the values of the phase function coefficients $W_1$-$W_5$ of the $1^{st}$ surface that forms the diffractive surface of the diffractive optical element $L_1$ of this embodiment. Phase function coefficients not listed in Table 5 are zero. An "E" in the data indicates that the number following the "E" is the exponent to the base 10. For example, "1.0E-2" represents the number $1.0 \times 10^{-2}$.

TABLE 5

| $W_1$ | -9.1700608E+1 |
|---|---|
| $W_2$ | 2.4117748E-1 |
| $W_3$ | 3.5714267E-1 |
| $W_4$ | 1.2327947 |
| $W_5$ | -1.9459621E-1 |

As is clear from Tables 2 and 3 above, the objective optical system of the present embodiment described above satisfies Conditions (1)-(3). Additionally, the objective optical system of the embodiment described above satisfies Conditions (4) with the value of f2/|f1| being equal to 3.27E-4 where, "E" indicates that the number following the "E" is the exponent to the base 10. For example, "1.0E-2" represents the number $1.0 \times 10^{-2}$.

Figure 2A:
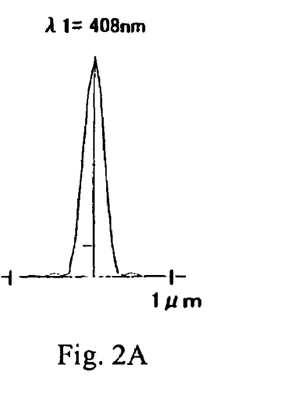
FIGS. 2A-2C illustrate intensity profiles of the light after being imaged to a spot by the objective optical system of Embodiment 1 of the present invention, with FIG. 2A being the light intensity profile of the spot used for the first optical recording medium, FIG. 2B being the light intensity profile of the spot used for the second optical recording medium, and FIG. 2C being the light intensity profile of the spot used for the third optical recording medium.
Figure 2B:
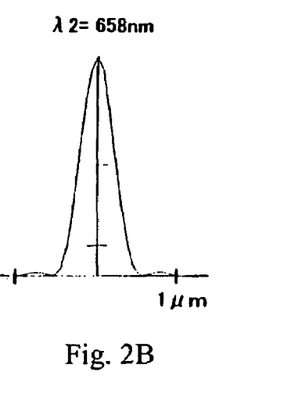
Figure 2C:
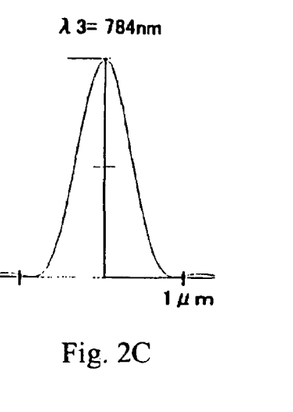

FIGS. 2A-2C illustrate intensity profiles of the light after being imaged to a spot by the objective optical system of Embodiment 1 of the present invention, with FIG. 2A being the light intensity profile of the spot used for the first optical recording medium 9a, which is an AOD, FIG. 2B being the light intensity profile of the spot used for the second optical recording medium 9b, which is a DVD, and FIG. 2C being the light intensity profile of the spot used for the third optical recording medium 9c, which is a CD.

Embodiment 2

Embodiment 2 is very similar to Embodiment 1 and therefore is well shown by FIGS. 1A-1C and FIG. 4. Embodiment 2 differs from Embodiment 1 in its diffractive optical element and objective lens configuration in terms of a different radius of curvature of the concave surface of the diffractive optical element, different values of the constants C, K and the aspheric coefficients of the aspheric surfaces, different spacings between the objective lens and the three optical recording media, and different materials for the diffractive optical element and the objective lens.

Table 6 below lists the surface #, in order from the light source side, the surface type or radius of curvature (in this case, the radii of curvature are given for planar surfaces, which have a radius of curvature of infinity), the on-axis distance (in mm) between surfaces for the three used wavelengths ($\lambda 1$=408 nm for the AOD 9a, $\lambda 2$=658 nm for the DVD 9b, and $\lambda 3$=784 nm for the CD 9c), and the refractive indexes at the three used wavelengths.

TABLE 6

| # | Surface Type or Radius of Curvature | Surface Spacing $\lambda$ = 408 nm | Surface Spacing $\lambda$ = 658 nm | Surface Spacing $\lambda$ = 784 nm | Refractive Index $\lambda$ = 408 nm | Refractive Index $\lambda$ = 658 nm | Refractive Index $\lambda$ = 784 nm |
|---|---|---|---|---|---|---|---|
| 1 | diffractive | 0.500 | 0.500 | 0.500 | 1.55636 | 1.54076 | 1.53704 |
| 2 | 35.539 | 0.500 | 0.500 | 0.500 | | | |
| 3 | aspheric | 1.920 | 1.920 | 1.920 | 1.55636 | 1.54076 | 1.53704 |
| 4 | aspheric | 1.580 | 1.668 | 1.544 | | | |
| 5 | ∞ | 0.600 | 0.600 | 1.200 | 1.62000 | 1.58000 | 1.57000 |
| 6 | ∞ | | | | | | |

Table 7 below lists, for each used wavelength, the diaphragm diameter (in mm), the focal length f (in mm), the numerical aperture NA and the apparent light source position (in mm, as measured from the diffractive surface of the diffractive optical element $L_1$).

TABLE 7

|  | $\lambda$ = 408 nm | $\lambda$ = 658 nm | $\lambda$ = 784 nm |
|---|---|---|---|
| diaphragm diameter | 3.9 | 4.0 | 3.2 |
| focal length, f | 3.00 | 3.10 | 3.10 |
| numerical aperture, NA | 0.65 | 0.65 | 0.51 |
| light source position | ∞ | ∞ | -38.10 |

Table 8 below lists the values of the constants C, K and the aspheric coefficients $A_2$-$A_5$ of each aspheric surface (numbered from the light source side) of this embodiment that are used in Equation (A) above. An "E" in the data indicates that the number following the "E" is the exponent to the base 10. For example, "1.0E-2" represents the number $1.0 \times 10^{-2}$. Aspheric coefficients that are not listed in Table 8 are zero.

TABLE 8

|  | $3^{rd}$ Surface | $4^{th}$ Surface |
|---|---|---|
| C | 5.0515098E-1 | -1.4873285E-1 |
| K | 4.4737881E-2 | 5.0662486E-2 |
| $A_2$ | 5.7368457E-3 | 1.0086162E-2 |
| $A_3$ | -3.2511284E-5 | -6.8080043E-4 |
| $A_4$ | 2.2881975E-4 | 6.3506051E-5 |
| $A_5$ | -1.2489915E-5 | -8.0018055E-6 |

Table 9 below lists the values of the phase function coefficients $W_1$-$W_5$ of the $1^{st}$ Surface that forms the diffractive surface of the diffractive optical element $L_1$ of this embodiment. Phase function coefficients not listed in Table 9 are zero. An "E" in the data indicates that the number following the "E" is the exponent to the base 10. For example, "1.0E-2" represents the number $1.0 \times 10^{-2}$.

TABLE 9

| $W_1$ | -5.9445198E+1 |
|---|---|
| $W_2$ | 1.9892426 |
| $W_3$ | -1.0898883 |
| $W_4$ | 9.1408381E-1 |
| $W_5$ | -1.1251417E-1 |

As is clear from Tables 6 and 7 above, the objective optical system of the present embodiment described above satisfies Conditions (1)-(3). Additionally, the objective optical system of this embodiment satisfies Condition (4) with the value of f2/|f1| being equal to 4.09E-4. An "E" in the data indicates that the number following the "E" is the exponent to the base 10. For example, "1.0E-2" represents the number $1.0 \times 10^{-2}$.

Figure 3A:
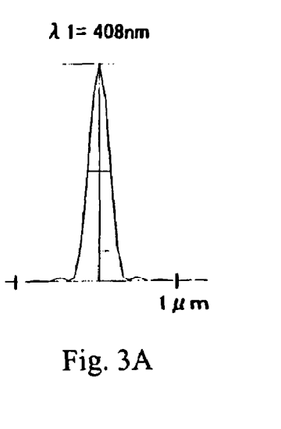
FIGS. 3A-3C illustrate intensity profiles of the light after being imaged to a spot by the objective optical system of Embodiment 2 of the present invention, with FIG. 3A being the light intensity profile of the spot used for the first optical recording medium, FIG. 3B being the light intensity profile of the spot used for the second optical recording medium, and FIG. 3C being the light intensity profile of the spot used for the third optical recording medium.
Figure 3B:
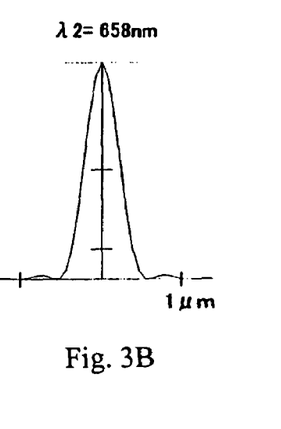
Figure 3C:
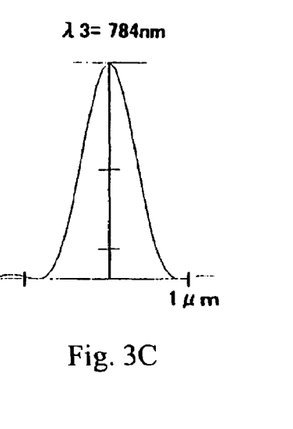

FIGS. 3A-3C illustrate intensity profiles of the light after being imaged to a spot by the objective optical system of Embodiment 2 of the present invention, with FIG. 3A being the light intensity profile of the spot used for the first optical recording medium 9a, which is an AOD, FIG. 3B being the light intensity profile of the spot used for the second optical recording medium 9b, which is a DVD, and FIG. 3C being the light intensity profile of the spot used for the third optical recording medium 9c, which is a CD.

The objective optical system for optical recording media of the present invention being thus described, it will be obvious that it can be varied in many ways. Likewise, the optical pickup device of the present invention being thus described, it will also be obvious that it can be varied in many ways.

For example, as a material for forming the objective optical system, using a plastic material enables the formation of a light and inexpensive objective optical system. Additionally, although in the embodiments described above, the light source side of the diffractive optical element is the diffractive surface and the surface facing the optical recording medium is the concave spherical surface, the location of these two surfaces can be switched. Also, a concave aspheric surface can be used instead of a concave spherical surface.

Furthermore, in the diffractive surface diffracting light of one of the three wavelengths in a predetermined order, it is preferable that a large quantity of light be diffracted, particularly as close to one hundred percent as is practical. Additionally, the structure of the diffractive optical surface is not limited to serrations but may also be formed as stepped structures.

Additionally, in the objective optical system for optical recording media and the optical pickup device of the present invention, the optical recording media, which are used for recording and reproducing, are not limited to AOD's, DVD's, and CD's. Rather, the present invention relates to optical systems and devices for recording and reproducing information with optical recording media that satisfy Conditions (1)-(3) above with a common optical pickup device. For example, instead of the AOD in the above described embodiments, a Blu-ray disc arrangement with a numerical aperture (NA) of 0.85, a recording medium substrate thickness of 0.1 mm, and a light beam with a wavelength of approximately 405 nm may be used.

Furthermore, even in the case when an AOD, a DVD and a CD are used as the optical recording media, as in the embodiments described above, the wavelengths of the light beams used are not limited to the particular values described above. For example, even if a light beam with a wavelength other than 408 nm is used for the AOD, a light beam with a wavelength other than 658 nm is used for the DVD, or a light beam with a wavelength other than 784 nm is used for the CD, as long as the beam of light to be used satisfies the technical standards described above for each optical recording medium, the wavelengths can be varied within a broad range. Additionally, broad variations apply to the choices of numerical apertures and the substrate thicknesses within the scope of the present invention.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective optical system for focusing light from a light source onto optical recording media, the objective optical system comprising, in order from the light source side along an optical axis:

a diffractive optical element that includes a diffractive surface on one side and a concave surface on the other side; and an objective lens having positive refractive power and a rotationally symmetric aspheric surface on each side;

wherein the objective optical system is configured to receive a collimated light beam of a first wavelength $\lambda 1$ on its light source side and focus second-order diffracted light diffracted by the diffractive surface of the diffractive optical element at a first numerical aperture NA1 onto a desired portion of a first optical recording medium having a substrate thickness d1, to receive a collimated light beam of a second wavelength $\lambda 2$ on its light source side and focus first-order diffracted light diffracted by the diffractive surface of the diffractive optical element at a second numerical aperture NA2 onto a desired portion of a second optical recording medium having a substrate thickness d2, and to receive a diverging light beam of a third wavelength $\lambda 3$ on its light source side and focus first-order diffracted light diffracted by the diffractive surface of the diffractive optical element at a third numerical aperture NA3 onto a desired portion of a third optical recording medium having a substrate thickness d3; and the following conditions are satisfied:

$$NA1 \geq NA2 > NA3$$

$$\lambda 1 < \lambda 2 < \lambda 3$$

$$d1 \leq d2 < d3.$$

2. The objective optical system according to claim 1, wherein the diffractive surface is formed as a diffractive structure on a virtual plane that is perpendicular to the optical axis.

3. The objective optical system according to claim 1, wherein the following condition is satisfied:

$$|f2/f1| < 0.03$$

where f1 is the focal length of the diffractive optical element for second-order diffracted light at the first wavelength $\lambda 1$, and f2 is the focal length of the objective lens having positive refractive power at the first wavelength $\lambda 1$.

4. The objective optical system according to claim 2, wherein the following condition is satisfied:

$$|f2/f1| < 0.03$$

where f1 is the focal length of the diffractive optical element for second-order diffracted light at the first wavelength $\lambda 1$, and f2 is the focal length of the objective lens having positive refractive power at the first wavelength $\lambda 1$.

5. The objective optical system according to claim 1, wherein:

the first optical recording medium is an AOD;

the second optical recording medium is a DVD; and the third optical recording medium is a CD.

6. The objective optical system according to claim 2, wherein:
the first optical recording medium is an AOD;
the second optical recording medium is a DVD; and
the third optical recording medium is a CD.

7. The objective optical system according to claim 3, wherein:
the first optical recording medium is an AOD;
the second optical recording medium is a DVD; and
the third optical recording medium is a CD.

8. The objective optical system according to claim 4, wherein:
the first optical recording medium is an AOD;
the second optical recording medium is a DVD; and
the third optical recording medium is a CD.

9. An optical pickup device that includes the objective optical system according to claim 1.

10. An optical pickup device that includes the objective optical system according to claim 2.

11. An optical pickup device that includes the objective optical system according to claim 3.

12. An optical pickup device that includes the objective optical system according to claim 4.

13. An optical pickup device that includes the objective optical system according to claim 5.

14. An optical pickup device that includes the objective optical system according to claim 6.

15. An optical pickup device that includes the objective optical system according to claim 7.

16. An optical pickup device that includes the objective optical system according to claim 8.

17. An optical pickup device comprising:
the objective optical system according to claim 1;
the first optical recording medium;
the second optical recording medium;
the third optical recording medium;
wherein
the first optical recording medium is an AOD;
the second optical recording medium is a DVD; and
the third optical recording medium is a CD.

18. The optical pickup device of claim 17, further comprising a light source that provides to the light source side of the objective optical system the collimated light beam of the first wavelength $\lambda 1$, the collimated light beam of the second wavelength $\lambda 2$, and the diverging light beam of the third wavelength $\lambda 3$;
wherein
the objective optical system focuses second-order diffracted light diffracted by the diffractive surface of the diffractive optical element at the first numerical aperture NA1 onto a recording region of the AOD, focuses first-order diffracted light diffracted by the diffractive surface of the diffractive optical element at the second numerical aperture NA2 onto a recording region of the DVD, and focuses first-order diffracted light diffracted by the diffractive surface of the diffractive optical element at the third numerical aperture NA3 onto a recording region of the CD.

19. The optical pickup device of claim 18, wherein the spherical aberration introduced by the objective optical system to each of the light beams of wavelengths $\lambda 1$, $\lambda 2$, and $\lambda 3$ compensates for the spherical aberration introduced by the substrate thicknesses d1, d2, and d3 of each of the AOD, DVD, and CD, respectively, so as to minimize spherical aberration in the light beam foci on the AOD, DVD, and CD.

* * * * *